United States Patent
Thomas et al.

(10) Patent No.: US 7,133,461 B2
(45) Date of Patent: Nov. 7, 2006

(54) STREAM TRANSMISSION METHOD AND DEVICE

(75) Inventors: Timothy A. Thomas, Palatine, IL (US); Frederick W. Vook, Schaumburg, IL (US)

(73) Assignee: Motorola, Inc., Schaumburg, IL (US)

(*) Notice: Subject to any disclaimer, the term of this patent is extended or adjusted under 35 U.S.C. 154(b) by 949 days.

(21) Appl. No.: 10/017,444

(22) Filed: Dec. 14, 2001

(65) Prior Publication Data

US 2003/0112889 A1 Jun. 19, 2003

(51) Int. Cl.
- H04L 27/04 (2006.01)
- H04L 27/12 (2006.01)
- H04L 27/20 (2006.01)

(52) U.S. Cl. ..................... 375/295
(58) Field of Classification Search ........... 375/231, 375/295, 347, 260, 299; 455/138, 562.1; 370/210

See application file for complete search history.

(56) References Cited

U.S. PATENT DOCUMENTS

| | | | | |
|---|---|---|---|---|
| 5,093,842 | A * | 3/1992 | Gimlin et al. ............ 375/227 |
| 5,442,661 | A * | 8/1995 | Falconer .................. 370/479 |
| 5,745,858 | A * | 4/1998 | Sato et al. ............... 455/562.1 |
| 5,953,311 | A | 9/1999 | Davies et al. |
| 6,014,412 | A | 1/2000 | Wiese et al. |
| 6,037,898 | A * | 3/2000 | Parish et al. .............. 342/174 |
| 6,115,406 | A * | 9/2000 | Mesecher .................. 375/130 |
| 6,185,251 | B1 | 2/2001 | Fertner |
| 6,191,736 | B1 * | 2/2001 | Yukitomo et al. ........... 342/383 |
| 6,289,045 | B1 | 9/2001 | Hassegawa et al. |
| 6,597,678 | B1 * | 7/2003 | Kuwahara et al. ........... 370/342 |
| 6,662,024 | B1 * | 12/2003 | Walton et al. ............. 455/562.1 |
| 6,665,545 | B1 * | 12/2003 | Raleigh et al. ............ 455/562.1 |
| 6,728,307 | B1 * | 4/2004 | Derryberry et al. ......... 375/219 |
| 6,760,388 | B1 * | 7/2004 | Ketchum et al. ........... 375/295 |
| 6,785,341 | B1 * | 8/2004 | Walton et al. ............. 375/267 |
| 6,785,520 | B1 * | 8/2004 | Sugar et al. .............. 455/101 |
| 6,885,875 | B1 * | 4/2005 | Benz et al. ............... 455/522 |
| 6,895,253 | B1 * | 5/2005 | Carloni et al. ............ 455/506 |
| 6,898,250 | B1 * | 5/2005 | Lee et al. ................ 375/267 |
| 6,952,459 | B1 * | 10/2005 | Voyer .................... 375/347 |
| 2001/0038666 | A1 * | 11/2001 | Mesecher et al. ........... 375/148 |
| 2002/0000948 | A1 * | 1/2002 | Chun et al. ............... 343/853 |
| 2002/0006168 | A1 * | 1/2002 | Lee et al. ................ 375/267 |
| 2002/0018530 | A1 * | 2/2002 | Kim et al. ................ 375/267 |

(Continued)

FOREIGN PATENT DOCUMENTS

EP 1276251 A1 * 1/2003

OTHER PUBLICATIONS

P. W. Wolniansky, G. J. Foschini, G. D. Golden, and R. A. Valenzuela; "V-Blast: An Architecture for Realizing Very High Data Rates Over the Rich-Scattering Wireless Channel," Proc. Of Issue-98, Pisa, Italy, pp. 295-300.

(Continued)

*Primary Examiner*—Emmanuel Bayard
*Assistant Examiner*—Lawrence B. Williams

(57) ABSTRACT

A transmitter for implementing a stream transmission method is disclosed. Optionally, the transmitter first determines an equal weighting of a plurality of stream weights and transmits a plurality of transmission signals as a function of a plurality of data streams and the equal weighting of the plurality of stream weights. Thereafter, the transmitter reiterates as needed a determination of an unequal weighting of the plurality of stream weights and a transmission of the plurality of transmission signals as a function of the plurality of data streams and the unequal weighting of the plurality of stream weights.

17 Claims, 3 Drawing Sheets

U.S. PATENT DOCUMENTS

| | | | |
|---|---|---|---|
| 2002/0027985 A1* | 3/2002 | Rashid-Farrokhi | 379/417 |
| 2002/0041253 A1* | 4/2002 | Ishii et al. | 342/383 |
| 2002/0061768 A1* | 5/2002 | Liang et al. | 455/561 |
| 2002/0098815 A1* | 7/2002 | Hattori et al. | 455/138 |
| 2002/0105961 A1* | 8/2002 | Hottinen et al. | 370/442 |
| 2002/0111191 A1* | 8/2002 | Takatori et al. | 455/562 |
| 2002/0118781 A1* | 8/2002 | Thomas et al. | 375/347 |
| 2002/0131381 A1* | 9/2002 | Kim et al. | 370/335 |
| 2002/0141587 A1* | 10/2002 | Ertel et al. | 380/270 |
| 2003/0035468 A1* | 2/2003 | Corbaton et al. | 375/148 |
| 2003/0035469 A1* | 2/2003 | Frank et al. | 375/150 |
| 2003/0043732 A1* | 3/2003 | Walton et al. | 370/208 |
| 2003/0048856 A1* | 3/2003 | Ketchum et al. | 375/260 |
| 2003/0064690 A1* | 4/2003 | Kasapi | 455/101 |
| 2003/0114193 A1* | 6/2003 | Kavak et al. | 455/562 |
| 2004/0192218 A1* | 9/2004 | Oprea | 455/73 |
| 2006/0039494 A1* | 2/2006 | Kim et al. | 375/267 |

OTHER PUBLICATIONS

Gregory G. Raleigh, "Spatio-Temporal Coding for Wireless Communication," IEEE Transactions on Communications, vol. 46, No. 3, Mar. 1998, pp. 357-366.

Timothy A. Thomas and Frederick W. Vook, "MIMO Strategies for Equal-Rate Data Streams," Proceedings of Fall VTC-Oct. 7-10, 2001, Atlantic City, NJ. 5 pages.

* cited by examiner

STREAM TRANSMISSION METHOD AND DEVICE

FIELD OF THE INVENTION

In general, the present invention relates to the field of communication systems. More specifically, the present invention relates to the transmission of data streams by a transmitter of communication system.

BACKGROUND OF THE INVENTION

Bell Labs Layered Space-Time ("BLAST") is a prior art technique for sending multiple data streams from a single transmitting device and may use successive cancellation to recover the transmitted symbols. Each data stream is transmitted with the same average power, and in order to perform successive cancellation, the optimal cancellation order of the data streams at the receiver needs to be determined. The prior art determination of the optimal ordering requires either channel knowledge at the transmitter to solve the ordering problem or a computationally complex algorithm in the receiver to determine the optimal ordering. Having channel knowledge at the transmitter requires a large amount of feedback in mobile channels, and transmitting each data stream with the same power requires a successive cancellation algorithm at the receiver to determine the ordering of the data streams. The consequence of both solutions is a burdensome, complex computation being performed by the transmitter or receiver, respectively.

Thus, there is a need for a new and unique data stream transmission method.

SUMMARY OF THE INVENTION

One form of the present invention is a method of operating a transmitter comprising a determination of an unequal weighting of a plurality of stream weights. In one aspect, the unequal weighting is accomplished by a determination of a mean square error for each stream weight of a plurality of stream weights, a determination of a first stream weight of the plurality of stream weights having the largest mean square error, an increase in a power of the first stream weight, and a decrease in a power of each stream weight of the plurality of stream weights excluding the first stream weight. In a second aspect, the unequal weighting is accomplished by an initialization of a first stream weight, an increase in the first stream weight by a product of a power variable and an increment, and a determination of a plurality of stream weights excluding the first stream weight as a function of a corresponding mean square error.

The foregoing form as well as other forms, features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
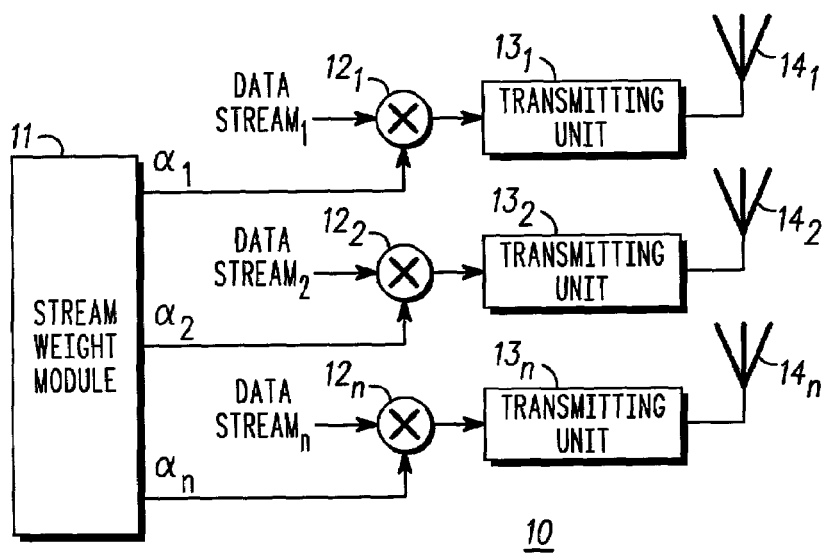
FIG. 1 illustrates one embodiment of a transmitter in accordance with the present invention.

FIG. 1 illustrates one embodiment of a transmitter in accordance with one embodiment of the present invention. In the illustrated embodiment, a transmitter 10 comprises a new and unique stream weight module 11, a plurality of conventional mixers $12_1$–$12_n$, a plurality of conventional transmitting units $13_1$–$13_n$, and a plurality of conventional antennas $14_1$–$14_n$. The stream weight module 11 provides a plurality of stream weights $\alpha_1$–$\alpha_n$ to the mixers $12_1$–$12_n$, respectively. The mixers $12_1$–$12_n$ conventionally mix the stream weights $\alpha_1$–$\alpha_n$ with a plurality of data streams$_{1-n}$, respectively, whereby the transmitting units $13_1$–$13_n$ and the antennas $14_1$–$14_n$ conventionally provide a plurality of transmission signals (not shown).

The stream weight module 11 can be implemented in hardware (analog and/or digital), software, or a combination of hardware and software. A functional description of the stream weight module 11 will now be provided herein in the context of an execution of a flowchart 20, a flowchart 30, and a flowchart 50 by the stream weight module 11. The stream weight module 11, as will be appreciated by those having ordinary skill in the art from the subsequent description herein, can be employed within various communications systems, such as, for example, a orthogonal frequency division multiplexing ("OFDM") system, a spread OFDM system, a single carrier system, a code division multiple access ("CDMA") system, and an interleaved frequency division multiple access ("IFDMA") system. Those having ordinary skill in the art will further appreciate a sequential operation of various stages of the stream weight module 11 (e.g., in a software implementation) and a concurrent operation of various stages of the stream weight module 11 (e.g., in a hardware implementation).

Because the determination of the unequal weightings for the stream weight module 11 requires some assumptions about the type of receiver that receives the signal transmitted from the transmitter 10, the received signal is now described. The signal from the transmitter 10 received at a receiving unit may be expressed in the frequency domain according to the following equation [1]:

$$Y(k) = \sum_{l=1}^{n} \alpha_l H_l(k) x_l(k) + N(k) \quad [1]$$

where k is an integer that may indicate the subcarrier number (or frequency bin), Y(k) is an $M_R \times 1$ vector where $M_R$ is the number of receive antennas, $H_l(k)$ is the $M_R \times 1$ channel vector for stream l, $x_l(k)$ is the frequency-domain data symbol for stream l on subcarrier k (for single-carrier, $x_l(k)$ is the Fast Fourier Transform ("FFT") of N time-domain symbols), and N(k) is additive noise that may have covariance matrix $\sigma^2 I$ where $\sigma^2$ is the noise power. The noise power is important in determining the best unequal stream weights as described below.

The determination of an unequal weighting of stream weights by the stream weight module 11 requires the transmitter to assume a type of demodulation used by the receiver. If the receiver performs successive cancellation (as is known in the art), the received symbols can be estimated according to the following equation [2]:

$$r_l(k) = w_l^H(k)\left\{Y(k) - \sum_{p=1}^{l-1} H_l(k)\hat{x}_l(k)\right\} \quad [2]$$

where $w_l(k)$ is given by the following equation [3]:

$$w_l(k) = \alpha_l\left(\sigma^2 I + \sum_{p=l}^{n} \alpha_p^2 H_p(k) H_p^H(k)\right)^{-1} H_l(k) \quad [3]$$

and for single carrier, $\hat{x}_l(k)$ is given by the following equation [4]:

$$\hat{x}_l(k) = FFT(\text{slice}\{IFFT[r_l(k)]\}) \quad [4]$$

where IFFT denotes an inverse FFT, and the slice operation refers to a symbol decision operation.

The idea of one embodiment of the present invention is to find the unequal stream weights that improve the mean square error performance of the successive cancellation receiver and allow the receiver to demodulate the data streams in an order known by the receiver to thereby thus avoid a need by the receiver to determine an optimal stream demodulating order. The stream demodulation order is set in equation [2]. In one embodiment, the stream demodulation ordering is from data stream$_1$ to data stream$_n$. Other predetermined orderings can also be used in alternative embodiments, such as, for example, the stream demodulation ordering can be from data stream$_n$ to data stream$_1$.

Each mean square error equation subsequently described herein assumes the successive cancellation operations described above.

Figure 2:
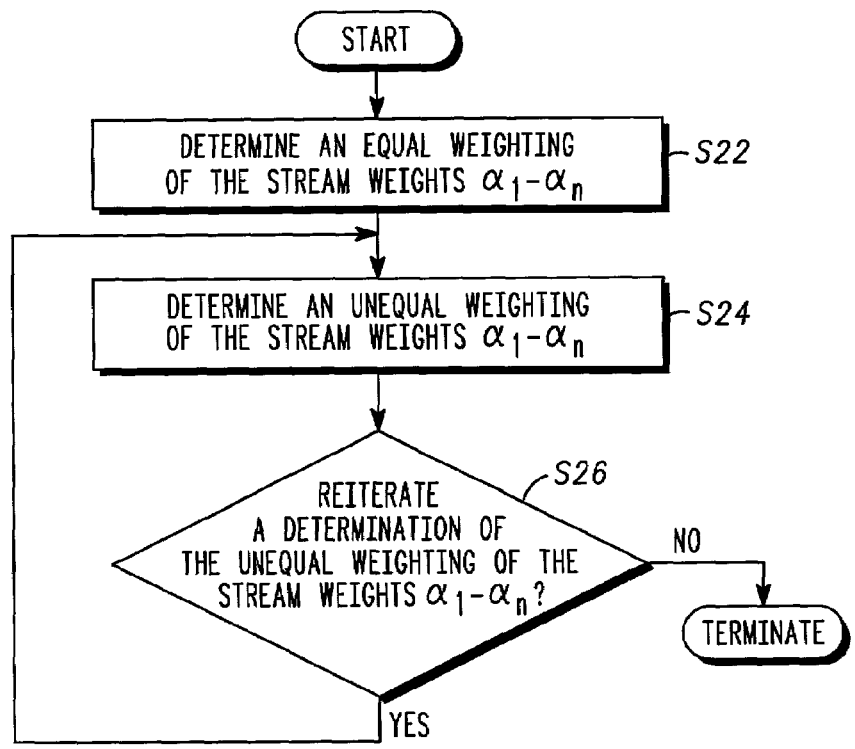
FIG. 2 illustrates a flowchart representative of a stream weighting determination method in accordance with the present invention.

FIG. 2 illustrates the flowchart 20 as a representation of a stream weighting method in accordance with the present invention. The stream weight module 11 initiates a stage S22 of the flowchart 20 upon an operational activation of the transmitter 10. During the stage S22, the stream weight module 11 determines an equal weighting for the stream weights $\alpha_1$-$\alpha_n$. In one embodiment, the equal weighting is dynamically determined, such as, for example, by an execution of one or more equations in real time by the stream weight module 11. In another embodiment, the equal weighting is pre-determined and stored whereby the stream weight module 11 retrieves the appropriate weight value for the stream weights $\alpha_1$-$\alpha_n$ in real time.

Upon completion of the stage S22, the stream weight module 11 proceeds to a stage S24 of the flowchart 20. In one embodiment, the stage S22 is completed by the stream weight module 11 within a prescribed time period as determined by the operational specification of a communication system employing the stream weight module 11. During the stage S24, the stream weight module 11 determines an unequal weighting of the stream weights $\alpha_1$-$\alpha_n$ whereby at least two or more of the stream weights $\alpha_1$-$\alpha_n$ have unequal weight values. In one embodiment, the unequal weighting is dynamically determined, such as, for example, by an execution of one or more equations in real time by the stream weight module 11. In another embodiment, the unequal weighting is pre-determined and stored whereby the stream weight module 11 retrieves the appropriate weight values for the stream weights $\alpha_1$-$\alpha_n$ in real time.

During a stage S26 of the flowchart 20, the stream weight module 11 ascertains a need for reiterating a determination of the unequal weighting of the stream weights $\alpha_1$-$\alpha_n$. In one embodiment, the stream weight module 11 proceeds to stage S24 to perform an additional determination of the unequal weighting when the current unequal weighting determination fails to achieve an optimal power allocation of the transmitted signals as determined by the operational specification of a communication system employing the stream weight module 11. Conversely, the stream weight module 11 proceeds to terminate the flowchart 20 when the current unequal weighting determination achieves an optimal power allocation of the transmitted signals.

In the embodiments where the unequal weighting of stream weights $\alpha_1$-$\alpha_n$ is pre-determined and stored, stage S22 may be omitted and stage S24 can determine the unequal weighting of stream weights $\alpha_1$-$\alpha_n$ from a lookup table operation. Additionally, a receiver may determine the unequal weighting of stream weights $\alpha_1$-$\alpha_n$ and provide such to stream weight module 11.

Those having ordinary skill in the art will appreciate various benefits of flowchart 20, such as, for example, improved receiver performance as measured by a bit error rate and simplified successive cancellation demodulation because the data streams will be decoded in order (i.e., the demodulation ordering of the streams does not need to be determined by the receiver).

Figure 3:
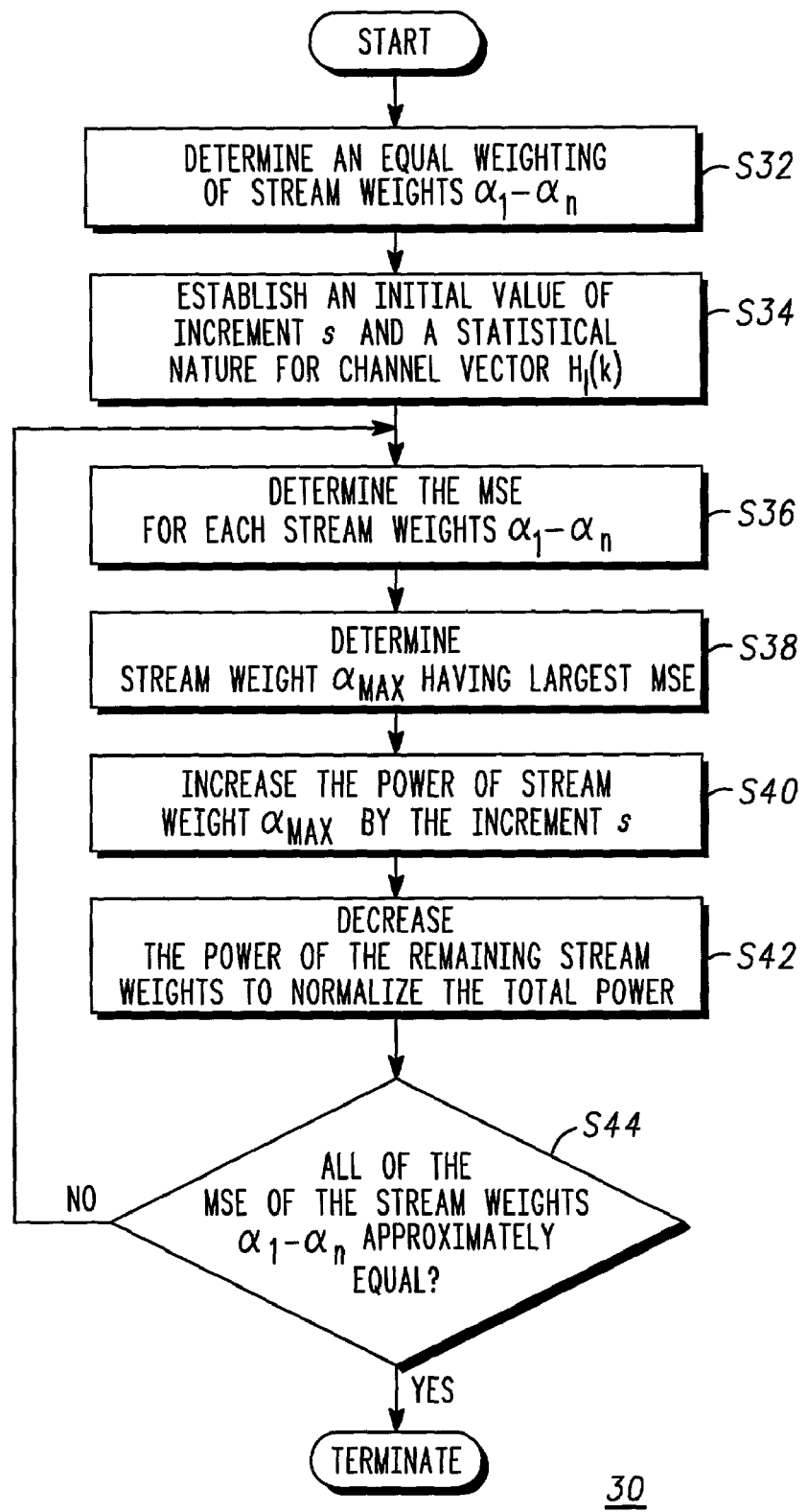
FIG. 3 illustrates a flowchart representative of a first embodiment of the stream weighting method of FIG. 2 in accordance with the present invention.

FIG. 3 illustrates a flowchart 30 as a representation of one embodiment of flowchart 20. During a stage S32, the stream weight module 11 determines an equal weighting of the stream weights $\alpha_1$-$\alpha_n$. In one embodiment of the stage S32, the equal weighting of the stream weights $\alpha_1$-$\alpha_n$ are determined in accordance with the following equation [5]:

$$\alpha_i = 1/\sqrt{n} \quad [5]$$

where i=1 to n, and n is the number of data stream$_1$-data stream$_n$.

Upon completion of the stage S32, the stream weight module 11 proceeds to a stage S34 of the flowchart 30 to establish an initial value for an increment s, and a statistical nature of channel vector $H_l(k)$ (for l=1, ... n). The statistical nature of $H_l(k)$ is used because the true channel in equation [1] may not be known by the transmitter 10 and thus when the unequal power weights are determined, a model for channel vector $H_l(k)$ may be employed. In one embodiment of the stage S34, the initial value of the increment s is an arbitrarily small number (e.g., 0.001). In another embodiment of the stage S34, the initial value of the increment s is determined in accordance with the following equation [6]:

$$s = \frac{1}{4\sqrt{n}} \quad [6]$$

In one embodiment of the stage S34, the statistical nature of channel vector $H_l(k)$ (for l=1, ... n) is determined whereby the stream weights $\alpha_1$-$\alpha_n$ can be averaged over at least one realization of channel vector $H_l(k)$. Specifically, the elements of channel vector $H_l(k)$ can be formed at each k by generating independent unit variance complex Gaussian random variables to approximate independent fading as is known in the art. In another embodiment of stage S34, channel vector $H_l(k)$ is generated as a FFT of some number (e.g., a L number) of time taps where the time taps span the expected delay spread of the channel and are generated as independent complex Gaussian random variables having some variance (e.g., 1/L).

Upon completion of the stage S34, the stream weight module 11 proceeds to a stage S36 of the flowchart 30 to determine a mean square error ("MSE") for each stream$_1$-stream$_n$ in accordance with the following equation [7]:

$$MSE_l = \sum_{k=0}^{N-1} \frac{1}{1 + \alpha_l^2 H_l^H(k) Q_l^{-1}(k) H_l(k)} \quad [7]$$

where $Q_l(k)$ is determined in accordance with the following equation [8]:

$$Q_l(k) = \sigma^2 I + \sum_{p=l+1}^{n} \alpha_p^2 H_p(k) H_p^H(k) \quad [8]$$

From equation [8], the noise power $\sigma^2$ of the receiver is needed to determine $Q_l(k)$. Thus, the noise power $\sigma_2$ of the receiver is vital to a determination of the unequal weighting of stream weights $\alpha_1-\alpha_n$.

Upon completion of the stage S36, the stream weight module 11 proceeds to a stage S38 of the flowchart 30 to determine the stream weight from the stream weights $\alpha_1-\alpha_n$ that has the largest MSE as determined during the stage S36 in accordance with equations [7] and [8]. The stream weight having the highest MSE is referred to as stream weight $\alpha_{max}$.

Upon completion of the stage S38 of the flowchart 30, a power of the stream weight $\alpha_{max}$ is increased by increment s during a stage S40 of the flowchart 30 and the remaining stream weights are decreased in power during a stage S42 of the flowchart 30 to realize the following equation [9]:

$$\sum_{l=1}^{n} \alpha_l^2 = 1 \quad [9]$$

An unequal weighting of the stream weights $\alpha_1-\alpha_n$ is achieved upon a completion of the stage S42 of the flowchart 30. The stream weight module 11 thereafter proceeds to a stage S44 of the flowchart 30 to ascertain a need for an additional iteration of the stages S36–S42 by ascertaining whether the MSE of each stream weight $\alpha_1-\alpha_n$ according to equations [7] and [8] are approximately equal, such as, for example, when the MSE of each stream weight $\alpha_1-\alpha_n$ is within 0.001 of each other. If so, the stream weight module 11 terminates the flowchart 30. Otherwise, the stream weight module 11 proceeds to stages S36–S42 for an additional determination of an unequal weighting of stream weight $\alpha_1-\alpha_n$.

In an alternative embodiment of the flowchart 30, the stage S32 may be omitted.

Figure 4:
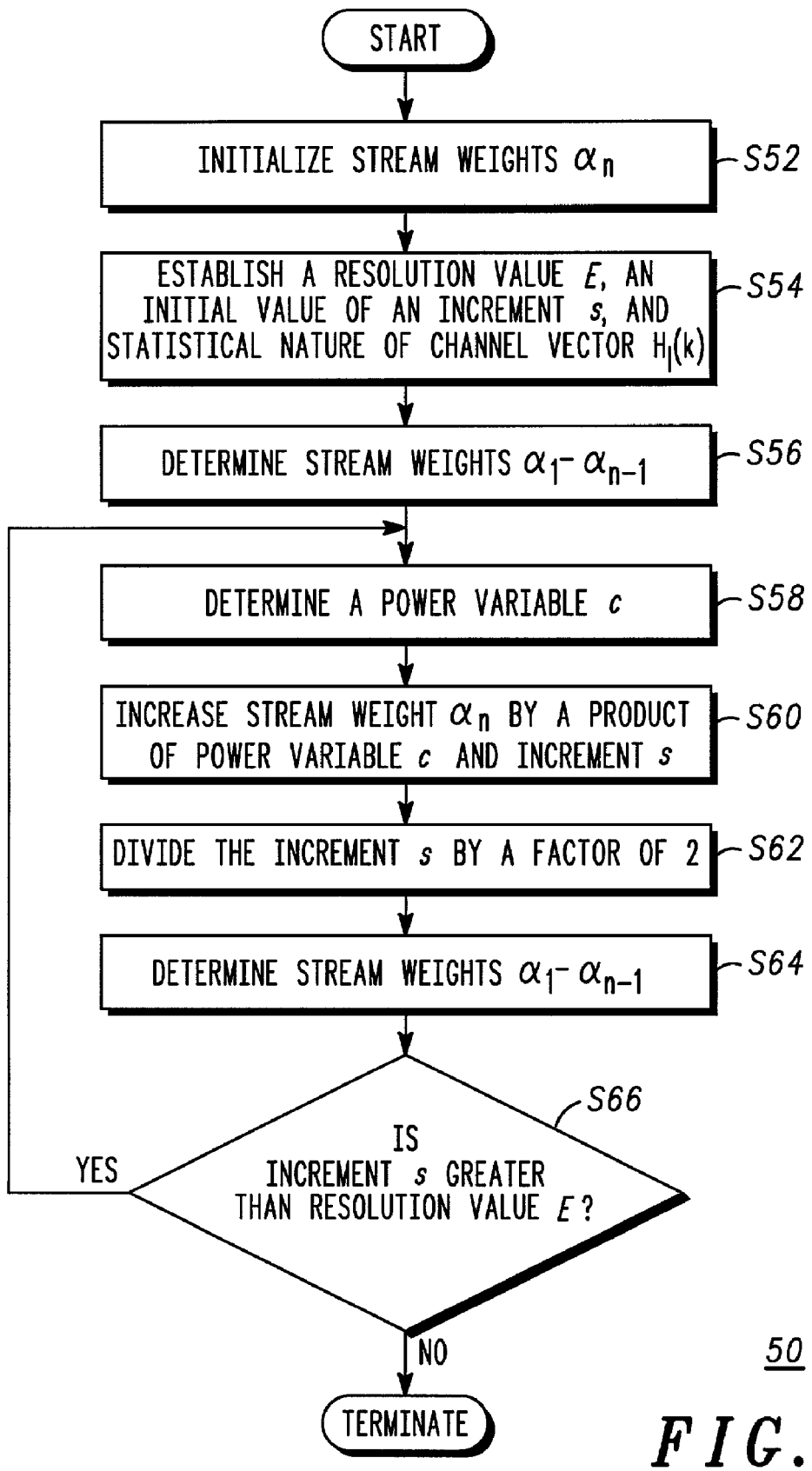
FIG. 4 illustrates a flowchart representative of a second embodiment of the stream weighting method of FIG. 2 in accordance with the present invention.

FIG. 4 illustrates a flowchart 50 as a representation of a second embodiment of flowchart 20 (FIG. 2). During a stage S52 of the flowchart 50, the stream weight module 11 initializes stream weight $\alpha_n$. In one embodiment of the stage S52, stream weight $\alpha_n$ is initialized in accordance with the following equation [10]:

$$\alpha_n = \frac{1}{2\sqrt{n}} \quad [10]$$

Upon completion of the stage S52, the stream weight module 11 proceeds to a stage S54 of the flowchart 50 to establish an initial value for an increment s and a statistical nature of channel vector $H_l(k)$ (for l=0, . . . n) as previously described herein in a connection with stage S34 of flowchart 30 (FIG. 3). Additionally, a resolution value E is established during stage S54. In one embodiment, the resolution value E is 0.001.

Upon completion of the stage S54, the stream weight module 11 proceeds to a stage S56 of the flowchart 50 to determine a weighting of the stream weights $\alpha_1-\alpha_{n-1}$. In one embodiment, the weighting of the stream weights $\alpha_1-\alpha_{n-1}$ are determined in accordance with the following equation [11]:

$$\alpha_l^2 = \frac{1}{MSE_n} \sum_{k=0}^{N-1} \frac{1}{H_l^H(k) Q_l^{-1}(k) H_l(k)} \quad [11]$$

where $MSE_n$ and $Q_l(k)$ are determined in accordance with equations [7] and [8], respectively.

Upon completion of the stage S56, the stream weight module 11 proceeds to a stage S58 of the flowchart 50 to determine a power variable c. In one embodiment, the power variable c is determined in accordance with the following equation [12]:

$$c = \text{sign}\left(1 - \sum_{l=1}^{n} \alpha_l^2\right) \quad [12]$$

where sign(x)=+1 if x>0, sign(x)=0 if x=0, and sign(x)=−1 if x<0.

Upon completion of the stage S58, the stream weight module 11 sequentially proceeds to a stage S60 of the flowchart 50 to increase the weighting of stream weights $\alpha_n$ by a product of power variable c and increment s, a stage S62 of the flowchart 50 to divide the increment s by a factor of two, and a stage S64 of the flowchart 50 to determine the weighting of the stream weights $\alpha_1-\alpha_{n-1}$ as previously described in connection with stage S56.

An unequal weighting of the stream weights $\alpha_1-\alpha_n$ is achieved upon a completion of the stage S64 of the flowchart 50. The stream weight module 11 thereafter proceeds to a stage S66 of the flowchart 50 to ascertain a need for an additional iteration of stages S58-S64 by comparing increment s and resolution value E. Stream weight module 11 proceeds to stage S58 when increment s is greater than resolution value E. Otherwise, the stream weight module 11 terminates the flowchart 50.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method of operating a transmitter, said method comprising:
   (1) being provided an average over at least one realization of a channel vector wherein elements of the channel vector are random variables;
   (2) determining a mean square error for each stream weight of a plurality of stream weights based on the average over at least one realization of a channel vector;
   (3) determining a first stream weight of the plurality of stream weights having the largest mean square error;
   (4) increasing a power of the first stream weight;
   (5) decreasing a power of each stream weight of the plurality of stream weights excluding the first stream weight; and
   repeating steps (2) through (5) when all of the mean square errors of the plurality of stream weights are unequal.

2. The method of claim 1, further comprising:
   establishing an increment,
   wherein an increasing of the power of the first stream weight is by a summation of the power and the increment.

3. A method of operating a transmitter, said method comprising:
   (1) initializing a first stream weight;
   (2) establishing a resolution value, an initial value of the increment, and a statistical nature of the channel vector;
   (3) determining a weighting of a plurality of stream weights excluding the first stream weight;
   (4) determining a power variable;
   (5) increasing the first stream weight by a product of the power variable and an increment;
   (6) dividing the increment by a factor subsequent to increasing the first stream weight by a product of the power variable and the increment;
   (7) determining a weighting of a plurality of stream weights excluding the first stream weight; and
   repeating steps 4–7 when the increment is greater than the resolution value.

4. A transmitter, comprising:
   a module operable to determine a first unequal weighting of a plurality of stream weights;
   means for transmitting a plurality of transmission signals as a function of a plurality of data streams and the first unequal weighting of the plurality of streams weights;
   wherein, to determine the first unequal weighting of the plurality of stream weights, said module is further operable to:
   (1) determine a mean square error for each stream weight of a plurality of stream weights;
   (2) determine a first stream weight of the plurality of stream weights having the largest mean square error;
   (3) increase a power of the first stream weight; and
   (4) decrease a power of each stream weight of the plurality of stream weights excluding the first stream weight and
   repeat steps (1) through (4) when all of the mean square errors of the plurality of stream weights are unequal.

5. The transmitter of claim 4, wherein:
   said module is operable to determine a second unequal weighting of the plurality of stream weights subsequent to the determination of the first unequal weighting for the plurality of stream weights; and
   the plurality of transmission signals are transmitted as a function of the plurality of data streams and the second unequal weighting of the plurality of streams weights.

6. The transmitter of claim 4, wherein, to determine the first unequal weighting of the plurality of stream weights, said module is further operable to:
   establish a set of statistics corresponding to a channel vector.

7. The transmitter of claim 4, wherein, to determine the first unequal weighting of the plurality of stream weights, said module is further operable to:
   establish an increment.

8. The transmitter of claim 7, wherein an increase in the power of the first stream weight is by a summation of the power and the increment.

9. The transmitter of claim 4, wherein, to determine a first unequal weighting of the plurality of stream weights, said module is further operable to:
   initialize a first stream weight; and
   increase the first stream weight by a product of a power variable and an increment.

10. A method of transmitting a plurality of data streams from a transmitter with multiple transmit antennas to a receiving unit, the method comprising the steps of:
    weighting data streams by unequal power weightings to create a plurality of weighted data streams, wherein the unequal power weightings for each data stream is based on a noise power and an average over at least one realization of a channel vector, wherein elements of the channel vector are random variables; and
    transmitting the plurality of weighted data streams to a receiving unit.

11. The method of claim 10 wherein the step of transmitting the plurality of weighted data streams involves transmitting the multiple data streams over multiple subcarriers.

12. The method of claim 10 wherein the random variables are independent complex Gaussian random variables.

13. The method of claim 10 further comprising the steps of:
    being provided the noise power; and
    determining the unequal power weighting for each data stream.

14. The method of claim 13 wherein the step of determining the unequal power weighting for each data stream involves determining unequal power weightings so that a stream decoding order of successive cancellation performed at the receiving unit is predetermined.

15. The method of claim 13 wherein the step of determining the unequal power weighting for each data stream involves determining unequal power weightings so that a mean squared error of each data stream after successive cancellation at the receiving unit is substantially equal.

16. The method of claim 13 wherein the step of being provided the noise power involves the receiving unit feeding back the noise power.

17. The method of claim 13 wherein the step of determining the unequal power weighting is performed at the receiving unit and the receiving unit provides the unequal power weights to the transmitter.

* * * * *